Dec. 16, 1952     P. H. CLEFF     2,621,546
TWO-SPEED GEARING
Filed Nov. 14, 1950
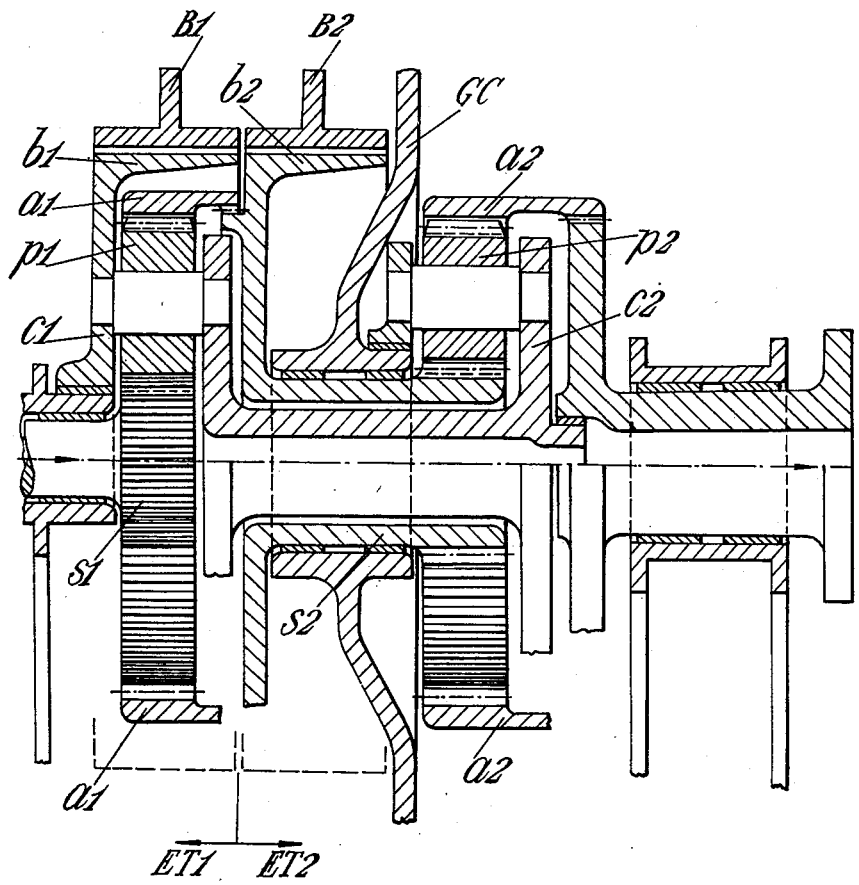
INVENTOR.
PETER HERBERT CLEFF
BY
ATTORNEYS Patented Dec. 16, 1952

2,621,546

UNITED STATES PATENT OFFICE 2,621,546

TWO-SPEED GEARING

Peter Herbert Cleff, Newcastle-on-Tyne, England, assignor to The Parsons and Marine Engineering Turbine Research and Development Association, Wallsend, England Application November 14, 1950, Serial No. 195,542
In Great Britain November 30, 1949

2 Claims. (Cl. 74—758)

This invention relates to two-speed gearing having no parts that run idly when either gear is in operation particularly for dealing with large horsepowers and embodying high reduction ratios where consideration has to be given to the weight, the space required, simplicity in design and manufacture, reliability in operation and ease of maintenance. Such requirements are encountered in marine power plants, for example.

The invention consists in a two-speed gear having no parts that run idly when either gear is in operation and provided with two simple epicyclic gears in series, one embodying a primary input power driving sun wheel, at least one planet wheel on a planet carrier and an annulus, the other embodying a secondary sun pinion in driving connection with said annulus, at least one further planet wheel on a further planet carrier directly driven by said first-mentioned planet carrier and a further annulus driving a power output shaft, braking means being provided between a fixed casing and said first-mentioned planet carrier and further braking means being provided between said fixed casing and said secondary sun wheel.

The accompanying diagrammatic drawing shows a longitudinal sectional view of a convenient form of two-speed gear embodying the present invention.

In carrying the invention into effect according to the form illustrated by way of example, there are provided two epicyclic trains $ET_1$ and $ET_2$ consisting respectively of sun pinion $s_1$, $s_2$, a set of planet wheels $p_1$, $p_2$, planet carrier $c_1$, $c_2$, annulus $a_1$, brake drum $b_1$, $b_2$ and brakes $B_1$, $B_2$.

The brakes are firmly attached to the gear case GC and may act upon the respective brake drums $b_1$ and $b_2$ of which the former is integral with the planet carrier $c_1$ and which latter is integral with sum pinion $s_2$ and is in driving connection with annulus $a_1$; the planet carriers $c_1$ and $c_2$ are rigidly coupled together.

Application of brake $B_1$ causes both trains $ET_1$ and $ET_2$ to operate as star gears, the sequence being:

Driving shaft—Primary sun pinion $s_1$—planets $p_1$—annulus $a_1$. Secondary sun pinion $s_2$—planets $p_2$—annulus $a_2$—driven shaft, and giving first speed $V_1$.

In order to obtain $V_2$, the second speed, brake $B_1$ is released and brake $B_2$ brought into operation. Annulus $a_1$ and secondary sun pinion $s_2$ become stationary and the two trains now run as epicyclic gears, the first, $ET_1$ having sun pinion $s_1$ as the driving and planet carrier $c_1$ as the driven member, whilst in the second, $ET_2$ the planet carrier $c_2$ acts as the driving and the annulus $a_2$ as the driven component.

I claim:

1. In a two-speed gear having no parts that run idly when either gear is in operation, the provision of two simple epicyclic gears in series, one embodying a primary input power driving sun wheel, at least one planet wheel on a planet carrier and an annulus, the other embodying a secondary sun pinion in driving connection with said annulus, at least one further planet wheel on a further planet carrier directly driven by said first-mentioned planet carrier and a further annulus driving a power output shaft, braking means being provided between a fixed casing and said first-mentioned planet carrier and further braking means being provided between said fixed casing and said secondary sun wheel.

2. A two-speed gear as claimed in claim 1 wherein the secondary sun pinion is connected to said first-mentioned annulus by means of splines.

PETER HERBERT CLEFF.

REFERENCES CITED

The following references are of record in the file of this patent:

UNITED STATES PATENTS

| Number | Name | Date |
|---|---|---|
| 1,132,390 | Royce | Mar. 16, 1915 |

FOREIGN PATENTS

| Number | Country | Date |
|---|---|---|
| 580,442 | Great Britain | Sept. 9, 1946 |
| 815,775 | France | July 22, 1937 |